Feb. 6, 1951 D. CAUCHENER 2,540,652
HEATING APPARATUS
Filed Dec. 6, 1947
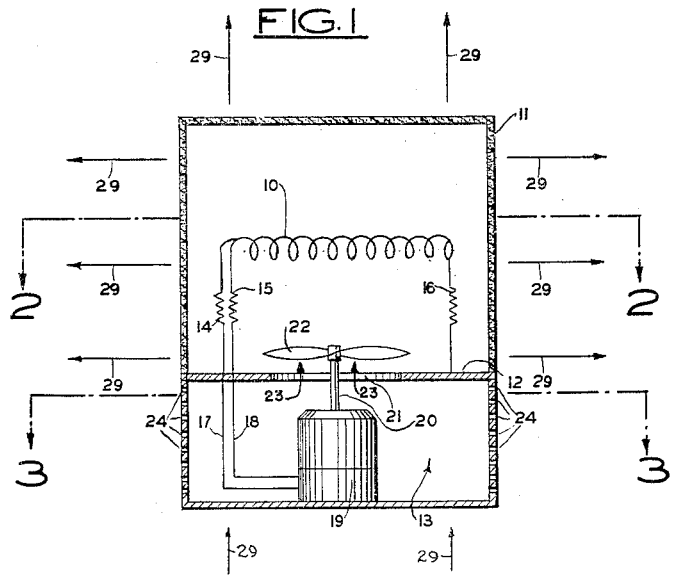
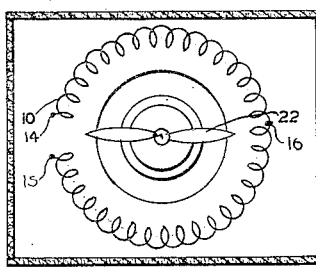
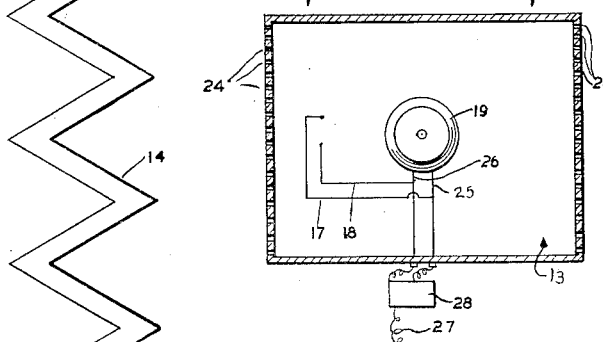
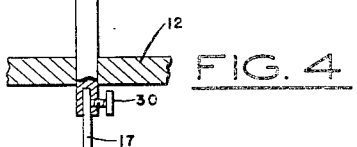

Patented Feb. 6, 1951

2,540,652

UNITED STATES PATENT OFFICE 2,540,652

HEATING APPARATUS

David Cauchener, New York, N. Y.

Application December 6, 1947, Serial No. 790,201

5 Claims. (Cl. 219—39)

My present invention relates to an air heating apparatus and more particularly to an air heating apparatus for heating rooms and the like.

It is an object of my present invention to provide an air heating device having a large heating surface.

It is another object of my present invention to provide a heating device with entirely enclosed heating means, e. g. an entirely enclosed electric heating coil avoiding the least danger of burning and fire.

It is a further object of my present invention to provide a heating device which will slowly become warm and slowly cool off, avoiding sudden temperature changes.

Furthermore, it is also an object of my present invention to provide a heating device in which the heating coil is arranged in such a manner as not to be subjected to sudden temperature changes, thereby extending the life of such a heating coil.

Still a further object of my invention consists in providing a heating device which can be equipped with automatic temperature control means which are independent of the temperature of the space immediately surrounding the heating coil.

With the above objects in view, my present invention mainly consists of a heating member, a closed casing enclosing this heating member, a highly porous wall forming part of this closed casing, and means for forcing air heated in the closed casing by the above mentioned heating member through the highly porous casing wall outside of the casing.

I wish to note that the term "porous" as used above and in the following description and claims is intended to be defined for air-permeable materials such as highly air-permeable bricks or concrete blocks, highly air-permeable building sheets, highly air-permeable insulating sheets and the like. I wish also to note that all such materials have to be not only porous, i. e. air-permeable, but they also have to be fire-proof in order to be adapted for the purposes of my present invention.

I have found it advisable to provide in the closed casing an opening and combine the same with means for sucking air through this opening into the closed casing, and forcing it after heating by the heating member through the highly porous wall of the casing outside of the same. In this manner it is possible to attain even distribution of the heat all around the casing without the danger of draughts or swift air movement within the heated room.

In accordance with a preferred embodiment of my present invention, a heating apparatus of the type proposed by me comprises a heating member, a base having a top wall supporting said heating member, an air-pervious closed casing made of a highly porous sheet material and mounted on said top wall of said base enclosing said heating member, an opening in said top wall of said base, and means for sucking air through said opening in said top wall of said base into said air-pervious closed casing and forcing said air after heating by means of said heating member in said air-pervious closed casing through the highly porous wall of the same outside of said casing.

Particularly good results were obtained by me with a heating apparatus comprising in combination an electric heating coil, a base having a top wall, supporting means resiliently mounting said electric heating coil on said top wall of said base, an air-pervious closed casing made of a highly porous sheet material and mounted on said base enclosing said electric heating coil and said supporting means, an opening in said top wall of said base, and fan means arranged within said air-pervious closed casing associated near said opening for sucking air through said opening in said top wall of said base into said air-pervious closed casing, and forcing said air after heating by said heating coil in said air-pervious closed casing through the highly porous wall of the same outside of said casing.

The novel features which I consider as characteristic for my invention are set forth in particular in the appended claims. The invention itself however, both as to its construction and its method of operation, together with additional objects and advantages thereof, will be best understood from the following description of specific embodiments when read in connection with the accompanying drawings, in which:

Fig. 1 is a vertical section through a heating apparatus according to my present invention;

Fig. 2 is a horizontal section through the heating apparatus shown in Fig. 1, along line 2—2 of Fig. 1; and Fig. 3 is a horizontal section through the base of the heating apparatus shown in Fig. 1, along line 3—3 of Fig. 1.

Fig. 4 is a detail of Fig. 1 shown at a larger scale.

In accordance with my present invention, I arrange the heating coil 10 in the closed casing 11, which is made entirely of an air-pervious highly porous sheet material.

This casing is mounted as clearly shown on the top wall 12 of the base 13 of the heating device.

This top wall 12 supports also by means of the resilient spring-like supports 14, 15 and 16 the heating coil 10.

The two resilient spring-like supports 14 and 15, serve also as electrical conductors, and are connected at their bottom ends with electrical wires 17 and 18, respectively, as clearly shown in Fig. 3. One of the resilient spring-like supports is shown separately at an enlarged scale in Fig. 4. The spring-like support 14 passes with the lower end thereof through the bottom wall 12 of the casing and is connected by a set screw 30 to the wire 17. The upper end of the spring-like support is connected to the heating member 10 by a set screw 31.

I arrange within the base 13 the electric motor 19, which is driving in well-known manner the shaft 20 passing through the opening 21 in the top wall 12 of the base.

At its upper end this shaft 20 carries the fan member 22 adapted to suck in air into the casing 11 during its operation as indicated in Fig. 1, by arrows 23.

In order to enable admission of air into the base 13, I provide in the wall of the same small openings 24 as clearly shown in Figs. 1 and 3.

The electric motor 19 is connected by conductors 25 and 26 with the electric cord 27, which is also connected in well-known manner to the electric wires 17 and 18.

If desired, I might include into the electric cord 27, at any point thereof, thermostatically operated switch means 28 automatically connecting the motor and heating means with the electric circuit when the temperature in the room drops below a pre-determined minimum temperature and automatically disconnecting the motor and heating means from the electric circuit when the temperature in the room rises above a pre-determined maximum temperature.

My new heating apparatus operates as follows:

In order to operate the apparatus, it is only necessary to connect the electric cord 27 with a source of electric current: if the temperature in the room is below the pre-determined minimum temperature the thermostatic switch means 28 will automatically connect both sets of wires 25, 26, and 17 and 18 respectively, with the electric circuit. This in turn will result in operation of the electric motor 19, and heating of the electric resistance coil 10.

Operation of the motor 19 in turn will result in rotation of the fan 22, sucking air into the casing 11 and forcing it after heating by coil 10 through the air-pervious casing walls in direction of arrows 29.

As clearly indicated by the arrows 29, by a heating device of the type proposed by me, the air will be evenly heated all around the apparatus without creation of draughts and air currents.

The term "closed casing," as used throughout the specification and claims, is used to define a casing which has no exit opening for the air heated therein but has only an inlet opening for the unheated air.

It will be understood that each of the elements described above, or two or more together, may also find a useful application in other types of heating apparatus.

While I have illustrated and described the invention as embodied in electric heating apparatus, I do not intend to be limited to the details shown, since various modifications and structural changes may be made without departing in any way from the spirit of my invention.

Without further analysis, the foregoing will so fully reveal the gist of my invention that others can by applying current knowledge readily adapt it for various applications without omitting features that, from the standpoint of prior art, fairly constitute essential characteristics of the generic or specific aspects of this invention and therefore, such adaptations should and are intended to be comprehended within the meaning and range of equivalence of the following claims.

What I claim as new and desire to secure by Letters Patent is:

1. A heating device comprising in combination, a heating member; an all around air-permeable closed-exit casing made of a highly porous sheet material and having a bottom wall having an opening, said casing enclosing said heating member; means for mounting said heating member on said bottom wall of said casing; a fan arranged in said casing between said bottom wall and said heating member, whereby said fan sucks air through said opening in said bottom wall and delivers the air to said heating member and to the walls of said air-permeable closed-exit casing so that heated air is supplied to the outside of said casing.

2. A heating device comprising in combination, a heating member; an all around air-permeable closed-exit casing made of a highly porous sheet material and having a bottom wall having an opening, said casing enclosing said heating member; means for mounting said heating member on said bottom wall of said casing; a fan arranged in said casing between said bottom wall and said heating member, said fan being arranged close to said opening in said bottom wall and having a diameter slightly larger than the diameter of said opening, whereby said fan sucks air through said opening in said bottom wall and delivers the air to said heating member and to the walls of said air-permeable closed-exit casing so that heated air is supplied to the outside of said casing.

3. A heating device comprising in combination, a heating member; an all around air-permeable closed-exit casing made of a highly porous sheet material and having a bottom wall having an opening, said casing enclosing said heating member; resilient means for mounting said heating member on said bottom wall of said casing; a fan arranged in said casing between said bottom wall and said heating member, whereby said fan sucks air through said opening in said bottom wall and delivers the air to said heating member and to the walls of said air-permeable closed-exit casing so that heated air is supplied to the outside of said casing.

4. A heating device comprising in combination, a heating member; an all around air-permeable closed-exit casing made of a highly porous sheet material and having a bottom wall having an opening, said casing enclosing said heating member; resilient spring-like supports for mounting said heating member on said bottom wall of said casing; a fan arranged in said casing between said bottom wall and said heating member, whereby said fan sucks air through said opening in said bottom wall and delivers the air to said heating member and to the walls of said air-permeable closed-exit casing so that heated air is supplied to the outside of said casing.

5. A heating device comprising in combination, a heating member; an all around air-permeable closed-exit casing made of a highly porous sheet material and having a bottom wall having an opening, said casing enclosing said heating member; resilient spring-like supports for mounting said heating member on said bottom wall of said casing, said resilient spring-like supports being at least partly electro-conductive and serving as current leads to said heating member; and a fan arranged in said casing between said bottom wall and said heating member, whereby said fan sucks air through said opening in said bottom wall and delivers the air to said heating member and to the walls of said air-permeable closed-exit casing so that heated air is supplied to the outside of said casing.

D. CAUCHENER.

REFERENCES CITED

The following references are of record in the file of this patent:

UNITED STATES PATENTS

| Number | Name | Date |
|---|---|---|
| 1,014,161 | Madsen | Jan. 9, 1912 |
| 2,259,712 | Sweetland | Oct. 21, 1941 |
| 2,267,547 | Zimmerman | Dec. 23, 1941 |